United States Patent [19]
Moore

[11] 3,850,566
[45] Nov. 26, 1974

[54] PARISON OVEN HAVING IMPROVED DISCHARGE STATION

[75] Inventor: Lawrence A. Moore, Rockford, Ill.

[73] Assignee: Beloit Corporation, Beloit, Wis.

[22] Filed: Dec. 22, 1972

[21] Appl. No.: 317,761

[52] U.S. Cl................ 425/387 B, 65/241, 65/260, 214/1 BC, 264/94, 425/DIG. 213
[51] Int. Cl............................................ B29d 23/03
[58] Field of Search......... 425/297, 326 B, 387 BO, 425/397, DIG. 213; 198/20; 214/1 BC, 1 BH; 65/241, 260; 264/94

[56] References Cited
UNITED STATES PATENTS

| | | | |
|---|---|---|---|
| 3,324,507 | 6/1967 | Arlo................................ | 425/387 B |
| 3,415,915 | 12/1968 | Lecluyse et al............. | 425/387 B X |
| 3,721,514 | 3/1973 | Harris............................. | 425/387 B |
| 3,787,170 | 1/1974 | Gilbert............................ | 264/94 X |
| 3,790,319 | 2/1974 | Hudson et al.............. | 425/DIG. 213 |

*Primary Examiner*—R. Spencer Annear
*Attorney, Agent, or Firm*—Larson, Taylor and Hinds

[57] ABSTRACT

A blow molding apparatus in which parisons are heated in an oven by moving continuously therethrough on a carrier, after which the parisons are removed by a transfer arm which carries them to a blow mold. A loop portion of the carrier at the oven discharge station is moved bodily so that the discharge station moves equal and opposite to the continuous carrier movement so that the effective speed of the carrier at the discharge station equals zero at the moment when the parisons are grasped for removal.

14 Claims, 4 Drawing Figures

PATENTED NOV 26 1974 3,850,566

PARISON OVEN HAVING IMPROVED DISCHARGE STATION

BACKGROUND OF THE INVENTION

This invention relates to blow molding, and in particular it relates to a new and improved arrangement for the discharge station of an oven which heats parisons prior to the blow molding operation.

The preforms used in a blow molding operation can take many different shapes and forms including, inter alia, tubes and discs. For simplicity and convenience, the present description will be concerned essentially with tubular preforms which will be referred to as parisons. However, it will be understood that the present invention is applicable to preforms of any shape.

In the art of blow molding pairsons into finished articles, the parisons must first be brought to a certain elevated forming temperature before the actual blow molding step. This forming temperature is normally obtained in one of two ways. First, the parison can be blow molded immediately as it is formed, and thus still hot from the parison forming process. For example, in the case of tubular parisons, the extruded tube can be delivered directly to the blow mold. In other procedures, it has been found convenient to separate the parison forming process from the blow molding process at least in time if not also in location. When following this procedure, the parisons, upon being formed, will then of course be permitted to cool down to room temperature while they are stored and/or transported for blow molding at a subsequent time. Consequently, when these parisons are to be utilized in the blow mold, they must first be heated to a suitable forming temperature. In view of this, this procedure of heating and using the parisons at a later time is referred to as the cold parison process.

In my copending application Ser. No. 276,071; filed July 28, 1972, now U.S. Pat. No. 3,765,813 which is a continuation of my application Ser. No. 3,003, filed Jan. 15, 1970, now abandoned there is described a complete cold parison blow molding apparatus including an oven for heating the parisons by mounting the parisons on an endless carrier which travels back and forth through the oven and a transfer arm which grasps the heated parisons out of the oven at a discharge station and carries them to the blow mold. For further details of this arrangement, reference is made to the said U.S. Pat. No. 3,765,813, which is incorporated by reference herein.

In the arrangement of my said copending application, the parison carrier is moving continuously along a horizontal path through the oven while the transfer arm follows a completely different path into and out of the oven, over the the blow mold and back to the oven and of course the transfer arm is stopping and starting rather than moving continuously. Thus, the problem exists of bringing into harmony the rather divergent paths followed by the carrier and the transfer arm for the moment when the transfer arm grasps the parison from the continuously moving carrier so that this grasping motion will be as smooth as possible without causing injury to the portion of the parison engaging the carrier during the moments when the parison is being removed. In my said copending application, this problem is solved by causing the transfer arm to move parallel to the carrier and at the same speed as the carrier during the moment when a parison is being grasped, thereby effecting zero relative movement between the transfer arm gripper and the parison to be removed during the moments of removal.

While the said arrangement in my said copending application has proved to be quite satisfactory, it has been found to have had certain limitations. Firstly, the mechanism for synchronizing the motion of the transfer arm with the motion of the carrier during removal tends to be somewhat complex. Further, this previous arrangement tends to be somewhat limited in its application. For example, with this somewhat complex arrangement, it is somewhat difficult to re-arrange the transfer arms, provide different numbers of transfer arms, etc.

Thus, there exists a continuing need for new and improved arrangements for bringing about a substantially zero relative movement between the transfer arm and the parison carrier during the parison removal step.

SUMMARY OF THE INVENTION

Thus, it is a purpose of the present invention to provide, at the discharge station of a parison heating oven, a new and improved arrangement for bringing into harmony the motion of the transfer arm and the carrier of parisons to be removed.

This purpose of the present invention is achieved by providing an arrangement wherein the absolute speed of the carrier means at a certain portion of the discharge station is reduced to zero, notwithstanding the fact that the carrier means continues to move continuously along its length. The transfer arm or transfer arms grasp one or more of the parisons on this portion of the discharge station during the moment when these parisons are in effect motionless. Consequently, the transfer arm mechanisms may be simplified since they may now simply be brought to a standstill over this portion of the discharge station during the removal process. ALso, because this standstill feature permits simplification of the transfer arm structure, it is now more convenient to utilize in conjunction with the parison heating oven a plurality of transfer arms, one or more of which may include thereon one or more grippers for gripping one or more parisons at the same time. If more than one transfer arm were provided, each transfer arm would carry the parisons to different mold stations, thus increasing the overall capacity of the apparatus.

In accordance with a preferred embodiment of the invention, the means for causing the said portion of the discharge station to stand still for a moment includes a means for arranging a portion of the carrier means in the shape of a loop and means for swinging this loop about an axis located generally at the opening thereof. By a suitable means such as a cam and follower, the loop may be oscillated about this axis. During one half of the oscillation, the loop would be moving such that its outer end moved equal and opposite to the continuous movement of the carrier, during which half cycle the parison removal would take place, and then during the opposite half of the cycle, the loop would swing back in preparation for a new cycle.

In accordance with a preferred embodiment of the invention, a horizontal support member is provided which is turnable about a vertical axis and has formed in the opposite end thereof sprockets for engaging the carrier. One of these sprockets has a lobed cam and follower arrangement associated therewith and a spring means is provided for urging the cam and follower together. With this structure, as the carrier moves about the support member, the cam and follower, in cooperation with the spring, cause the support member to oscillate back and forth about its axis.

Thus, it is an object of this invention to provide a new and improved discharge station for a parison heating oven.

It is another object of this invention to provide, for use in a parison heating oven of the type wherein the parison carriers move continuously therethrough, a means for causing the absolute speed of a portion of the carrier to be reduced to zero.

It is another object of this invention to provide, in a cold parison blow molding apparatus of the type using a transfer arm for carrying parisons from the parison heating oven to the blow mold, an arrangement for vastly simplifying the means for bringing about zero relative movement between the transfer arm and the parisons during the moment when the transfer arms grasp these parisons for removal from the oven.

It is another object of this invention to provide, in a cold parison blow molding apparatus, a means for increasing the capacity of the overall apparatus.

It is another object of this invention to provide in a discharge station for a parison heating oven of the type having a parison carrying means moving continuously therethrough, a means for forming a portion of the carrier into a loop swingable about an axis for reducing the absolute speed of a portion of the continuously moving carrier to zero.

Other objects and advantages of the present invention will become apparent from the detailed description to follow, together with the accompanying drawings.

BRIEF DESCRIPTION OF THE DRAWINGS

There follows a detailed description of preferred embodiments of the invention to be read together with the accompanying drawings in which.

DETAILED DESCRIPTION OF PREFERRED EMBODIMENTS

Figure 1:
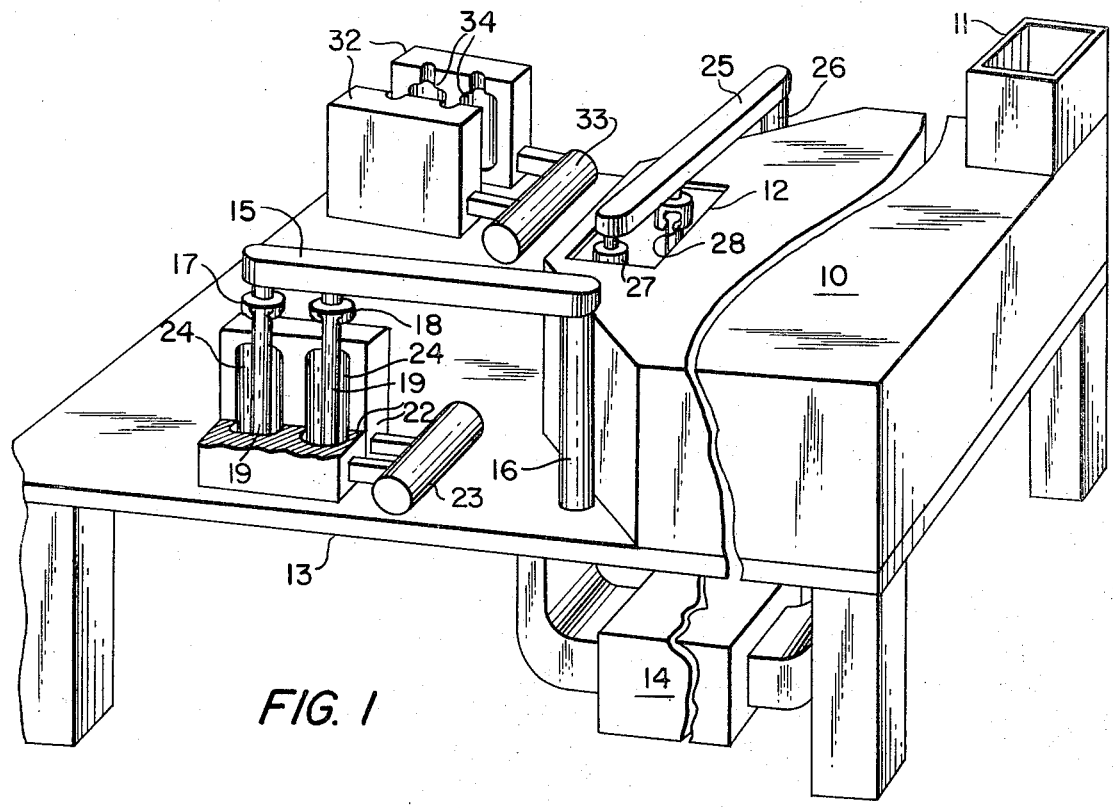
FIG. 1 is a perspective view of an overall cold parison blow molding apparatus similar in many respects to the arrangement of my said copending application.

Referring now to the drawings, like elements represent like numerals throughout the several views.

FIG. 1 illustrates a parison heating oven 10 having an inlet hopper 11, the details of which are described in my said copending application, an outlet opening 12, and a base 13 on which the oven is mounted. Hot air is circulated through the oven to heat the parisons the heater 14 being illustrated schematically in FIG. 1. A transfer arm 15 is mounted on and turnable about the axis of a post 16. Connected to this transfer arm 15 is a pair of grippers 17 and 18, each capable of gripping a single parison 19.

Figure 2:
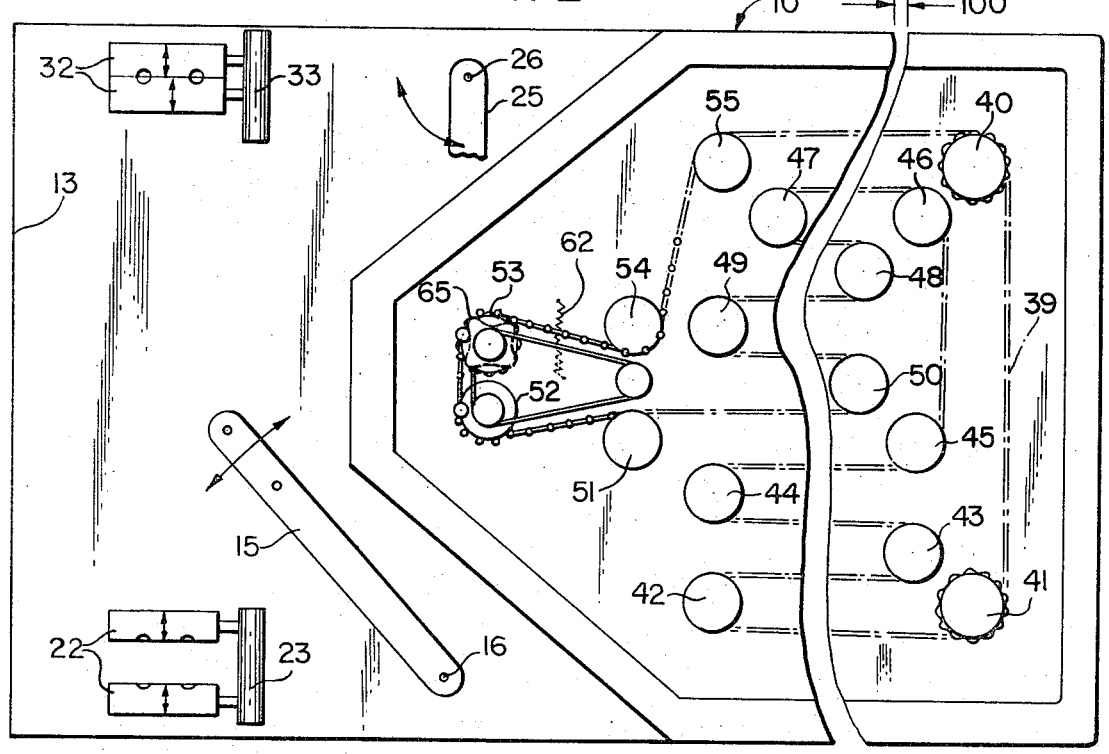
FIG. 2 is a plan view of the apparatus of FIG. 1 with portions cut away and the top of the oven removed for purposes of clarity.

Mounted on the base 13 in a position to receive the parisons is a pair of mold halves 22, one of which is cut away to reveal the cavities 24 in the mold halves. These mold halves 22 are movable towards and away from each other by any suitable actuating mechanism as shown schematically at 23 in FIGS. 1 and 2. One suitable actuating means is shown in my said U.S Pat. No. 3,765,813, and another is shown in commonly owned U.S. Pat. No. 3,807,929.

As described above, one feature of the present invention is that it permits the transfer arms to be rather uncomplicated. As a result of this, considerable flexibility is permitted in designing the transfer arms. For example, it is of course possible to use only a single transfer arm with a single gripper thereon as shown in my said U.S. Pat. No. 3,765,813. Similarly, a single transfer arm can be provided with two grippers thereon as illustrated or more than two grippers. Or alternatively, any number of transfer arms can be provided. As illustrative of one of these multitudes of arrangements, the present drawings show a second transfer arm 25 rotatable about the axis 26 of a post similar to post 16 and having attached thereto grippers 27 and 28 similar to grippers 17 and 18. These grippers are described in detail in my said U.S Pat. No. 3,765,813. This transfer arm 25 would cooperate with a blow mold arrangement similar to that with which the transfer arm 15 cooperates. This second blow mold apparatus includes a pair of mold halves 32 with cavities 34 formed therein, the halves being movable towards and away from each other by an actuating mechanism shown schematically at 33.

FIG. 1 illustrates how the capacity of the blow molding apparatus can be increased by using a second transfer arm. The two transfer arms would be operated essentially out of phase with each other so that as one transfer arm moved toward the blow mold to deliver its parisons thereto, the other transfer arm would move towards the oven 10 for grasping additional parisons through the opening 12.

The interior of the oven itself can take many different forms. The important feature is that the endless carrier 39, the details of which are described in my said U.S. Pat. No. 3,765,813 and also in the Moore et al U.S. Pat. NO. 3,740,868 follows a path through the oven which is long enough for the parisons to be heated to the proper forming temperature between the time that they are introduced at the loading station and the time they reach the discharge station. In the illustrated embodiment, the oven 10 includes sprockets 40–55, which sprockets are numbered in the sequence that the endless carrier 39 passes thereby. The loading station would be provided in the area of sprocket 40. Only one of these sprockets need be positively driven. For example, it would probably be most convenient to simply drive the sprocket 41 which is located towards a corner of the apparatus although other sprockets could also be positively driven if desired. The discharge station would be located in the area of sprockets 51, 52, 53, and 54, and in particular along the portion of conveyor 39 extending between sprockets 52 and 53, over which portion the opening 12 would be located.

Figure 3:
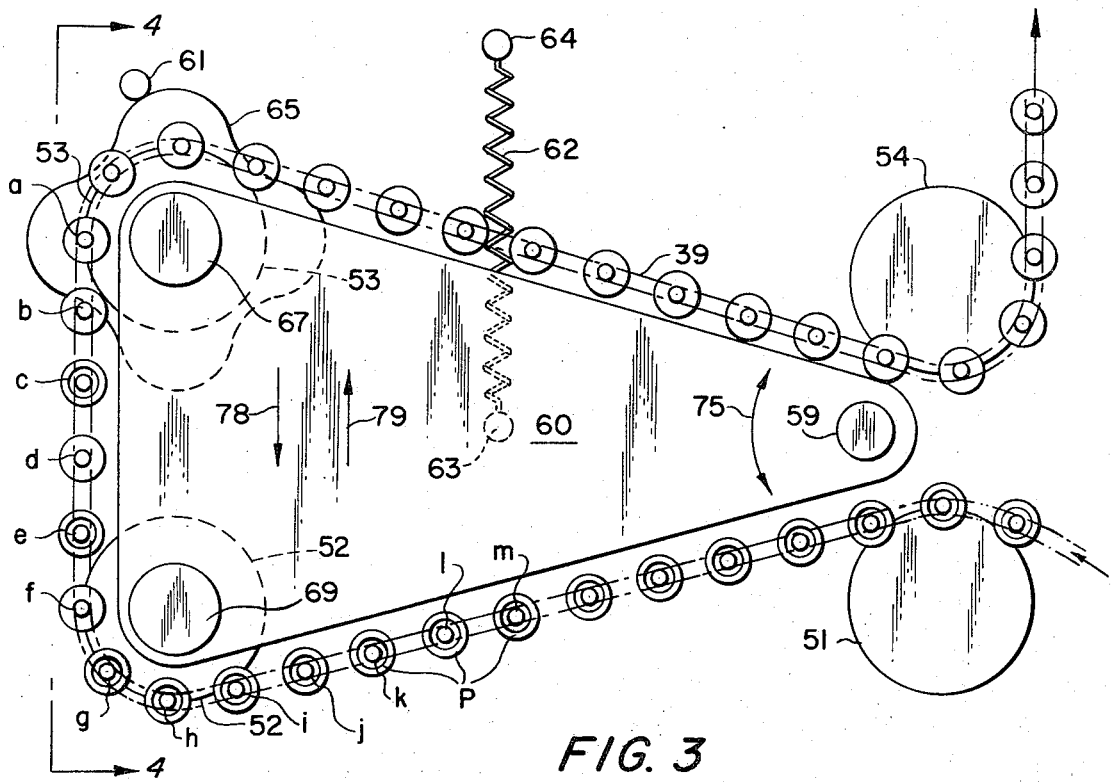
FIG. 3 is an enlarged view of a portion of FIG. 2.
Figure 4:
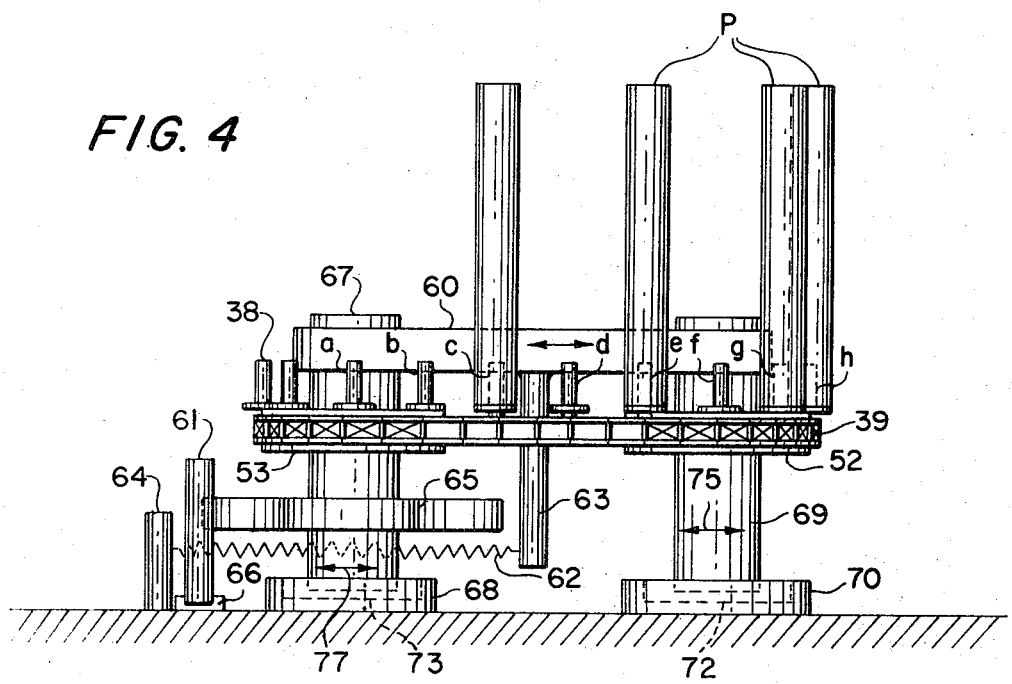
FIG. 4 is an end elevational view taken along line 4—4 of FIG. 3.

The discharge station is shown in greater detail in FIGS. 3 and 4. The carrier 39 has a plurality of parison holders 38 evenly spaced therealong for carrying parisons P through the oven. The details of these holders are also shown in the said Moore et al U.S. Pat. No. 3,740,868. In the vicinity of the discharge station, the carrier 39 is supported by sprockets 51, 52, 53 and 54. As is evident from these views, these sprockets form a loop, the opening neck of which is located between sprockets 51 and 54. Located within the loop is a generally isoceles triangular plate 60. In the vicinity of the apex of the triangle, the plate 60 is journalled on a shaft 59 which shaft is fixed relative to the casing of oven 10, whereby the plate 60 is pivotable about the axis of shaft 59 as indicated by the arrow 75.

The sprocket 52 is fixedly mounted for rotation with a shaft 69, the upper portion of which extends freely rotatably through a mating opening in the plate 60. The lower end of shaft 69 is mounted in a suitable mounting indicated schematically at 70, which mounting includes an elongated slot 72 permitting the shaft 69 to move back and forth within this slot as indicated by the arrow 76 as the plate 60 pivots about the axis of shaft 59.

The sprocket 53 is similar to the sprocket 52 in that it is fixedly mounted on a shaft 67 rotatably received in the plate 60 and slidably mounted in a slot 73 in a mounting shown schematically at 68 so that the shaft can move back and forth in this slot as indicated by arrow 77 as the plate 60 pivots about the axis of shaft 59. In addition, shaft 67 has fixed thereon for rotation therewith a lobed cam 65. Mounted for free rotation about its axis in a mounting 66 is a cam follower 61, against which the cam 65 is urged by means of spring 62.

The preferred embodiment of the invention, as described in the drawings, operates as follows. The endless carrier 39 moves through the oven continuously at a constant speed. The parison holders 38 which are shown spaced apart evenly in FIG. 3 actually extend with this constant spacing throughout the length of endless carrier 39. As the carriers 38 approach sprocket 40, they are empty, their parisons having been earlier removed. In the vicinity of sprocket 40 the holders are then loaded with parisons from hopper 11. The parisons then travel along the long back and forth path through the oven around sprockets 41-51 heating up to the proper forming temperature. As the parisons P move about sprocket 52 onto the line between sprockets 52 and 53, they have been heated to the proper temperature and are ready to be removed from the oven.

The specific dimensions of the discharge station and the cam would depend on the specific one of the multitude of possible arrangements of transfer arms utilized for moving the heated parisons. One specific example is illustrated, but it will be apparent that the various specific relationships such as the spacing of the parison holders, the size of the sprockets 52 and 53, the shape and size of the cam 65, etc., can be varied depending on the particular mode of operation.

In the present embodiment, the cam 65 has four raised lobes and the sprockets 52 and 53 are so dimensioned that the holders 38 are spaced approximately 45° about the portion of the peripheries thereof which the endless carrier 39 engages. The height of the raised portions of cam 65 would depend upon the speed of movement of the endless carrier 39 along its length. For convenience, the holders 38 are indicated in FIG. 3 with the lower case letters a–m. In the present embodiment, the position in which the holders a and f are located would be the actual pickpoints from which two parisons would be picked concurrently by the two grippers 17 and 18 or 27 and 28. In the present embodiment, the endless carrier 39 will move twice the distance between adjacent holders 38 between each picking operation.

With the elements as shown in FIG. 3, parisons have just been picked from holders a and f. The portion of endless carrier 39 between the sprockets 52 and 53 was at a standstill during the picking operation because this portion was moving about the axis 59 in the direction of the arrow 78 by virtue of the fact that a high point on cam 65 was engaging the follower 61 and held thereagainst by spring 62. Say for example that this particular picking operation was with transfer arm 25. The endless carrier 39 will now move the distance of twice the spacing between holders 38 while the plate 60 swings in the opposite direction as indicated by arrow 79 as a low portion of cam 65 engages the roller 61. During the next picking procedure, the grippers 17 and 18 of arm 15 will then remove the parisons on holders c and h. During the next picking operation, the grippers 27 and 28 of transfer arm 25 will remove the parisons on holders e and j. During the next operation, the grippers 17 and 18 of transfer arm 15 will remove the parisons on holders g and l, and so on.

The operation would be similar in the case where each transfer arm had only one gripper thereon. In that case there would be a single pickpoint located at the position of the holder d half-way between the positions of the holders a and f. In this case, the cam 65 would have eight lobes rather than four lobes since there would be eight picking times rather than four picking times for each 360° of rotation of the cam 65, and each of the molds 22 and 23 would have only a single cavity rather than a pair of cavities. Each time the endless carrier moves the distance between adjacent holders, one parison would be picked, the two transfer arms alternating with each other.

As described in my earlier application, the actual removal of the parisons takes place as the transfer arm 15 or 25, as the case may be, after having grasped the parisons, raises upwardly to clear the parisons from the oven and then swings about its respective axis carrying the parisons to the respective mold, at which location the parisons are lowered and gripped at their lower ends by means in the mold. In one type of operation in which the parisons are stretched, the transfer arm would then raise upwardly, still holding its parisons to thereby stretch the same. The mold halves would then close, cutting off the parisons leaving scrap pieces still held by the grippers. The grippers would then release the scrap pieces as the transfer arm moves back to the oven.

Although the invention has been described in considerable detail with respect to a preferred embodiment thereof, it will be apparent that the invention is capable of numerous modifications and variations apparent to those skilled in the art without departing from the spirit and scope of the invention.

I claim:

1. An apparatus for forming parisons into finished articles comprising:

an oven means for heating parisons to a forming temperature, a blow molding means for blow molding the heated parisons into finished articles and a transfer means for transferring the heated parisons from a discharge station in the oven to the blow molding means, said oven including a continuously progressing conveyor means for carrying parisons through the oven and a delay means for momentarily reducing to substantially zero the absolute velocity of a portion of the conveyor means at the discharge station, during which moment the transfer means can grasp heated parisons therefrom for removal from the oven, and during which moment the conveyor means continues said continuous progressing movement.

2. An apparatus according to claim 1, said delay means including means for bodily moving a portion of the conveyor means at the discharge station in a direction opposite to the direction of continuous progressing movement of the conveyor means and at a speed equal to the forward speed of said continuous progressing movement, such that the absolute speed of the conveyor means at said discharge station is substantially zero.

3. An apparatus according to claim 2, a plurality of parison holders spaced along said conveyor for carrying parisons in an upright condition along a horizontal path within the oven, said conveyor means being formed into a loop at the discharge station, and said means for bodily moving the conveyor means including means for oscillating the loop horizontally about a vertical axis such that as the transfer means grasps parisons, the conveyor means loop moves in a direction which is equal and opposite to the said continuous movement to effect said zero absolute movement, and wherein the transfer means are free of engagement with the parisons on the conveyor means during the return movement of the loop during the other cycle of its oscillating motion.

4. An apparatus according to claim 3, including a support member supporting said conveyor means loop, said support member being mounted to oscillate about said vertical axis, a circular cam having high and low peripheral surfaces, said cam operatively connected to said support member and positively engaging said conveyor means to turn about its axis in response to said continuous movement of the conveyor means,
a fixed cam follower,
a spring means for urging the support member about said vertical axis to urge the cam against the follower,
whereby as the conveyor means moves continuously and the cam turns relative to its axis, its high and low surfaces alternately oppose and release said spring, causing said oscillating movement of the loop.

5. An apparatus according to claim 4, said conveyor means being an endless carrier with said parison holders spaced evenly therealong means for passing said carrier along from a parison loading station, through an elongated path through the oven, and through said discharge station, and back to said loading station.

6. An apparatus according to claim 4, said support member being an essentially isosceles triangular plate, said vertical axis being located essentially at the apex of the triangular plate, and said discharge station being along the base of said isosceles triangle across from said apex.

7. An apparatus according to claim 6, including a wheel at each base angle of the isosceles triangle, each wheel engaging the conveyor means, said cam being coaxial and fixed for rotation with one of said wheels.

8. An apparatus according to claim 6, said transfer means including at least one transfer arm which is turnable about a vertical axis between the discharge station and the blow mold and movable vertically at the discharge station to grasp a parison and at the mold station to load the parison into the mold.

9. An apparatus according to claim 8, said transfer arm axis aligned with the base of the isoceles triangle and said transfer arm including at least two grippers thereon aligned with each other on a radius from the transfer arm axis, the grippers being spaced from the transfer arm axis such that both are along the said base when the transfer arm is swung over to the discharge station, whereby both of said grippers can pick a parison concurrently.

10. An apparatus according to claim 9, said blow mold comprising a pair of blow mold cavities, the center plane which separate the mold halves of the two cavities being on a common plane which lies on a radius of the transfer arm axis, whereby when the transfer arm moves to the blow mold carrying two heated parisons, it can concurrently deliver these two parisons to the said blow molds.

11. An apparatus for forming parisons into finished articles comprising:
an enclosed oven for heating parisons to a forming temperature, an endless carrier mounted in the oven and including a plurality of parison holders thereon, means for loading parisons onto the endless carrier at a loading station, said endless carrier being arranged to carry the parisons continuously through an endless path to heat the parisons to a forming temperature as they arrive at a discharge station,
means for forming said endless carrier into a loop, the outer portion of which loop constitutes said discharge station,
means for oscillating this loop about an axis perpendicular to the plane including the endless path, such that during a portion of said oscillation, the outer portion of the loop moves equal and opposite to the said continuous movement of the endless carrier along said endless path,
a transfer means for grapsing the heated parisons at the discharge stations during said portion of the loop oscillation, at which time the relative movement between the transfer arm and the endless carrier at the discharge station is substantially zero,
and including a blow molding station, said transfer means being a transfer arm movable between the discharge station and the blow mold and movable vertically at the discharge station to grasp a parison at the mold station and to load the parison onto the mold.

12. An apparatus according to claim 11, including a blow molding station, said transfer means being a transfer arm turnable about a vertical axis between the discharge station and the blow mold and movable vertically at the discharge station to grasp a parison and at the mold station to load the parison onto the mold.

13. An apparatus according to claim 12, said transfer arm axis aligned with the base of the isosceles triangle and said transfer arm including at least two grippers aligned with each other and lying on a radius from the transfer arm axis, the grippers being spaced from the transfer arm axis such that both are along the said base discharge station when the transfer arm is swung over to the discharge station, whereby both of said grippers can concurrently pick parisons.

14. An apparatus for forming parisons into finished articles comprising: an enclosed oven for heating parisons to a forming temperature, an endless carrier mounted in the oven and including a plurality of parison holders thereon, means for loading parisons onto the endless carrier at a loading station, said encless carrier being arranged to carry the parisons continuously through an endless path to heat the parisons to a forming temperature as they arrive at a discharge station, means for forming said endless carrier into a loop, the outer portion of which loop constitutes said discharge station, means for oscillating this loop about an axis perpendicular to the plane including the endless path, such that during a portion of said oscillation, the outer portion of the loop moves equal and opposite to the said continuous movement of the endless carrier along said endless path, a transfer means for grasping the heated parisons at the discharge stations during said portion of the loop oscillation, at which time the relative movement between the transfer arm and the endless carrier at the discharge station is substantially zero, said loop being triangular, the axis of oscillation being at one apex of the triangle and the discharge station being along a straight line along the side of the triangle across from said apex, said transfer means including at least one transfer arm rotatable about an axis aligned with the straight edge of the triangle which includes the discharge station, said transfer arm including at least two downwardly extending parison grippers thereon, said grippers being arranged on the transfer arm to selectively grip two parisons concurrently during said portion of the oscillation.

* * * * *